(12) United States Patent
Guerin et al.

(10) Patent No.: US 6,619,418 B1
(45) Date of Patent: *Sep. 16, 2003

(54) FRICTION MATERIAL FOR A DRY FRICTION DEVICE, A METHOD OF MAKING SUCH A DRY FRICTION MATERIAL, AND A DRY FRICTION DEVICE EQUIPPED WITH SUCH A MATERIAL

(75) Inventors: Richard Guerin, Flers de L'orne (FR); Gérard Jacq, Athis de L'orne (FR)

(73) Assignee: Valeo, Paris Cedex 17 (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 165 days.

(21) Appl. No.: 08/668,264

(22) Filed: Jun. 20, 1996

(30) Foreign Application Priority Data

Jun. 21, 1995 (FR) .............................. 95 07544

(51) Int. Cl.⁷ .............................. F16D 65/04
(52) U.S. Cl. .................... 180/250; 188/250; 428/300.1; 442/101
(58) Field of Search ...................... 188/250; 428/300.1; 442/101

(56) References Cited

U.S. PATENT DOCUMENTS

| | | | |
|---|---|---|---|
| 4,130,537 A | 12/1978 | Bohrer | 260/38 |
| 4,605,527 A | 8/1986 | Kamiura et al. | 264/137 |
| 4,950,530 A | 8/1990 | Shibatani | 428/259 |

FOREIGN PATENT DOCUMENTS

| | | |
|---|---|---|
| DE | 3414027 | 9/1983 |
| EP | 451 320 | 3/1990 |
| EP | 530 741 | 3/1993 |
| FR | 2 379 563 | 9/1978 |

OTHER PUBLICATIONS

French Search Report dated Mar. 11, 1996.

*Primary Examiner*—Joseph K. McKane
*Assistant Examiner*—Kamal Saeed
(74) *Attorney, Agent, or Firm*—Morgan & Finnegan, LLP

(57) ABSTRACT

A dry friction device, in particular a clutch friction wheel or a brake disc for a motor vehicle, includes at least one friction liner made of a dry friction material containing reinforcing fibers.

Such a friction material comprises a mat of fibers impregnated with a thermosetting resin, the fibers having a length of at least 40 mm. Glass fibers are preferably incorporated into the mat.

13 Claims, 2 Drawing Sheets

FRICTION MATERIAL FOR A DRY FRICTION DEVICE, A METHOD OF MAKING SUCH A DRY FRICTION MATERIAL, AND A DRY FRICTION DEVICE EQUIPPED WITH SUCH A MATERIAL

FIELD OF THE INVENTION

The present invention relates to a friction material for a dry friction device, a method of making such a dry friction material, and a dry friction device equipped with such a material, and the like.

More particularly, the dry friction device may, without limitation, be a clutch disc or a brake disc, for example for a motor vehicle, and the friction material may be formed into a friction liner in the form of a flat annular ring.

BACKGROUND OF THE INVENTION

Dry friction materials employed at the present time fall into three main types, namely, filament based materials, woven materials, and molded materials.

Filament based materials and woven materials, consist essentially of filaments which are provided for reinforcing purposes, being impregnated with thermosetting resin or with rubber, and having various fillers incorporated. Materials of this general type have various disadvantages. Their manufacture calls for the use of noxious solvents, and special arrangements have to be made in order to prevent such solvents escaping into the surrounding atmosphere.

It has been proposed to replace these noxious solvents by water, but in that case it is necessary to provide means for purifying the water, or for purifying vapour that is rejected at the end of the manufacturing process.

These arrangements, which not only add complication and difficulty to the methods of manufacture, are furthermore not wholly effective.

As to dry friction materials of the molded type, these are generally made in a humid vacuum, in a mixing process which again has the same type of disadvantage.

In addition, in the methods currently used, only reinforcing fibers of relatively short fiber length can be employed. In general, the mean fiber length is less than 5 mm. As a result, these molded friction materials are not strong enough to resist the effects of centrifugal force, in particular when they are hot; and this makes them unsuitable for use, for example, in a dry clutch friction disc which is driven in rotation at speeds that may exceed 6000 revolutions per minute.

DISCUSSION OF THE INVENTION

An object of the present invention is to overcome the above mentioned drawbacks, by proposing a dry friction material which has improved technical characteristics, while at the same time having a selling price which is less than that of known materials.

Another object of the invention is to provide such a material in which the method of making the material does not involve pollution of the natural environment, but also enables used friction materials, and the residues resulting from machining of the new friction materials, to be recycled.

A further object of the invention is to provide a dry friction material which has a stable coefficient of friction combined with high resistance to wear.

According to the invention in a first aspect, a friction material for equipping an apparatus employing dry friction, and more particularly a clutch or brake disc, is characterised in that it consists of a mat of fibers impregnated with a thermosetting resin, and in that the fibers have a length at least equal to 40 mm.

The fibers have a mean length preferably at least equal to 120 mm.

Preferably, the fibers are selected from the group consisting of fibers of cotton, viscose, linen, polyacrylonitrile, preoxidised polyacrylonitrile, para-aramide, meta-aramide, mineral fibers such as E-C-R glass, rock wool, and ceramic.

According to a preferred feature of the invention, glass is incorporated in the mat in the form of continuous filament of glass yarn comprising fibers of small diameter, and/or in the form of roving a glass yarn with more larger fibers, and/or in textured or bulked form.

The diameters of the glass fibers are preferably in the range between 6 and 21 micrometres.

Preferably, the glass fibers have been subjected to adhesion, impregnation of phenolic resin, and/or impregnation of rubber.

Powder fillers are preferably incorporated in the mat. Preferably, the powder fillers comprise, wholly or partly, at least one substance selected from the following elements, and compounds: copper, rock wool, nitryl rubber powder, carbon black, hexamethylene tectramine, gilsonite, litharge, melamine resin, phenolic resin, sulphur, cardolite, zirconium silicate, iron sulphide, alumina, latex, used clutch liners reduced to powder, friction liner rectification dust, zinc oxide.

Short fibrous fillers may be incorporated in the mat or be present in the latter.

According to the invention in a second aspect, a method of making a friction liner for dry friction operation is characterised by the following steps:

(a) a mixture of fibers of the same nature or of different materials, as set forth above in relation to the invention in its first aspect, is made in a mixer;

(b) the mixture is carded so as to form a carded web;

(c) the carded web is napped;

(d) glass is incorporated in the carded web at the instant of the napping step;

(e) the mat is subjected to a preliminary rolling treatment, or condensed.

Powder fillers are preferably sprinkled on the carded web between steps (b) and (c).

The carding operation is preferably carried out using a card of the wool carding type.

According to a preferred feature of the invention in its second aspect, the mat is brought to a thickness in the range between 3 mm and 10 mm, between heating platens. This step is preferably carried out at a temperature between 50° C. and 100° C. and at a pressure which is preferably between 1 bar and 10 bars.

The mat is then preferably cut into bands across its width, these cut bands preferably having a width in the range between 100 mm and 450 mm. The cut bands are then preferably welded together, preferably with the use of thin heating plates, the temperature of which is preferably in the range between 50° C. and 100° C. The cut bands are preferably welded together with an overlap between them in the range between 3 mm and 20 mm.

This produces a continuous welded band or strip, which is preferably then wound on to a winding member such as a bobbin, after which it is drawn off the latter and formed into a tube having an internal diameter which is defined by a mandrel having a variable diameter. The external diameter of this tube is preferably obtained by means of an appropriate draw length, i.e. by appropriate control of the rate at which the welded band is drawn from, the bobbin to the mandrel. The internal and external diameters of this tube preferably lie in the range between 100 mm and 250 mm, and 140 mm and 450 mm respectively. Winding of the welded band on to the mandrel is preferably carried out in contact with heating cylinders.

After the tube has been formed, an annular ring can be cut from the tube. The depth of this annular ring preferably lies in the range between 8 mm and 25 mm, and the step of cutting the annular ring from the tube is preferably effected by means of rotary slitters.

The annular ring is preferably placed in the bottom of a mold in which it is subjected to heat treatment under pressure, at a temperature which is preferably in the range 150° C. to 250° C., with a pressure being applied to the material that preferably varies between 20 bars and 300 bars.

According to the invention in a third aspect, a rotatable clutch friction disc, for dry friction operation, includes at least one friction liner, and preferably two friction liners disposed on either side of a support member, and is characterised in that the friction liner is made of a friction material in accordance with the invention in its first aspect. This material is preferably made by a method according to the second aspect of the invention.

Further features and advantages of the product and the method according to the invention will appear more clearly on a reading of the following detailed description of preferred embodiments of the invention, in terms of both the product and the method, all given by way of example only and with reference to the accompanying drawings.

Figure 1:
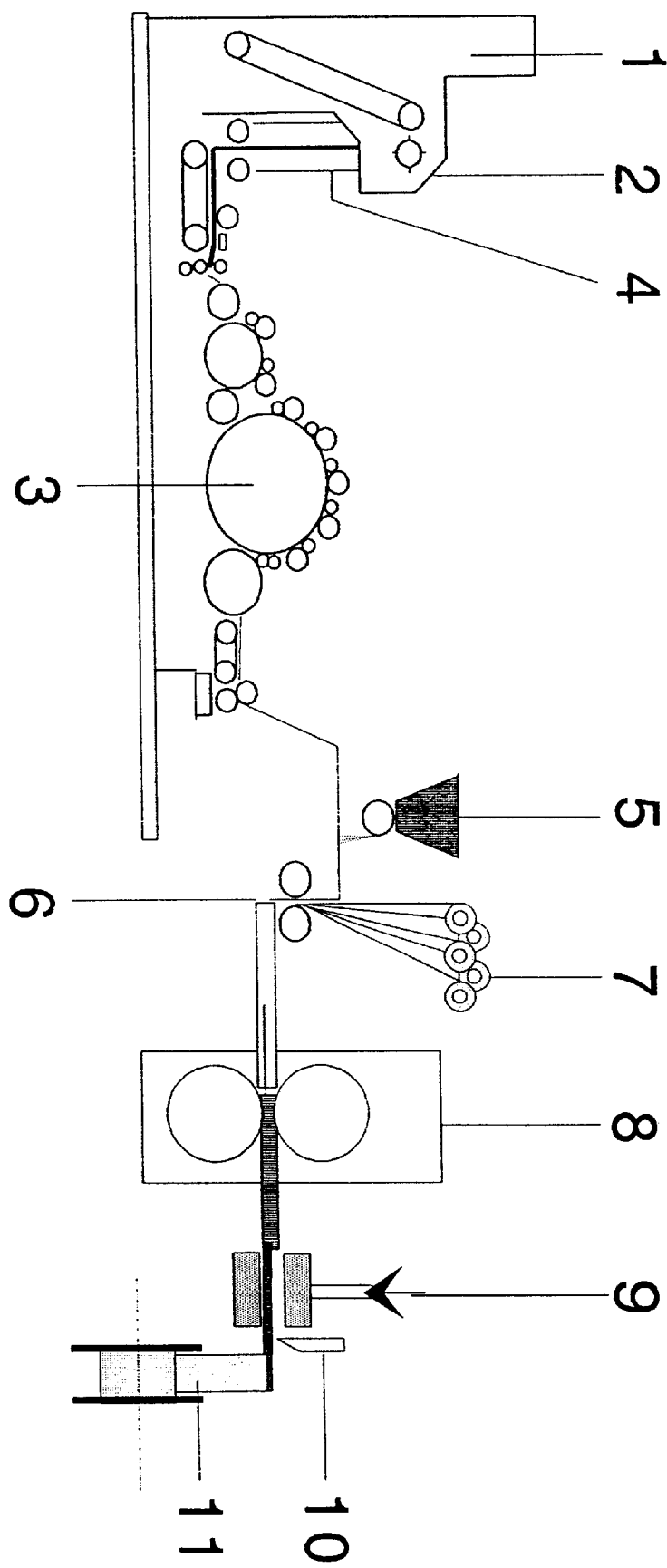
FIG. 1 shows diagrammatically a first part of the plant for putting into practice the method in accordance with the invention.

DESCRIPTION OF PREFERRED
EMBODIMENTS OF THE INVENTION

With reference to the following table, three fiber mats, represented as examples A, B and C respectively, are made from compositions as set forth in the table and containing the parts by weight of fibers indicated.

| Fibres | Example A | Example B | Example C |
|---|---|---|---|
| Polyacrylonitrile (PAN) or preoxidised PAN - parts by weight | 13 | 15 | 11 |
| E - glass | 0 | 0 | 4 |

The mean length of the fibers employed is as follows:
PAN fibers: 42 mm;
Glass fibers: 40 mm.

The fibers, or a mixture of the above fibers mixed in a mixer, are introduced into the hopper 1 (see FIG. 1) of a feeder 2 for a card 3, of the type used for carding wool. The feeder 2 has a feed chimney 4. Particulate fillers are sprinkled, by means of a sprinkler device 5 at the outlet of the card 3, on the carded web which is formed in the latter.

These particulate fillers have the following composition, which is a composition by weight in relation to the parts by weight of fibers given above:

| Particulate fillers | Example A | Example B | Example C |
|---|---|---|---|
| Dust obtained from the rectification of friction liners | 34.5 | — | 34.5 |
| Phenolic resin | 33.8 | 14.0 | 33.8 |
| Nitryl rubber | 7.5 | 9.0 | 7.5 |
| Cardolite | 3.7 | — | 3.7 |
| Sulphur | 0.4 | 2.0 | 0.4 |
| Carbon black | — | 4.7 | — |
| Hexamethylene tetramine | — | 0.3 | — |
| Litharge | — | 4.6 | — |
| Melamine resin | — | 10.8 | — |
| Zinc oxide | — | 0.3 | — |
| Copper powder | — | 4.6 | — |

The glass is incorporated into the carded web by means of an applicator 7.

The glass has the following composition, which is a composition by weight with respect to the parts by weight of fibers and particulate fillers given above:

| Glass | Example A | Example B | Example C |
|---|---|---|---|
| Continuous glass filament | 7 | — | 3.5 |
| Textured glass | — | 35 | — |

The glass employed is E-glass, the mean diameter of which is as follows:
continuous glass filament ("silione"): 9 micrometres;
defibrillised glass filament: 12 micrometres.

The carded web is subsequently napped by means of a napper 6, and the nap thus formed is subjected to a preliminary rolling treatment by means of rollers 8. The unwoven mat thus formed is, in this example, compressed to the required thickness between a pair of heated platens 9, and is then cut into successive sections, referred to here as cut bands, by a guillotine 10 cutting transversely, i.e. along the width of the mat.

The cut bands are then, in the example shown in the drawings, overlapped with each other and welded together, by means of a thin heating plate, not shown, at a temperature of 50–100° C., so as to form a continuous welded band. The overlap is between 3 and 20 mm, the cut bands (and therefore the welded band) having a width of 100–450 mm.

The welded band is rolled on to a bobbin 11 at the exit end of the first or upstream section, shown in FIG. 1, of the production line.

Figure 2:
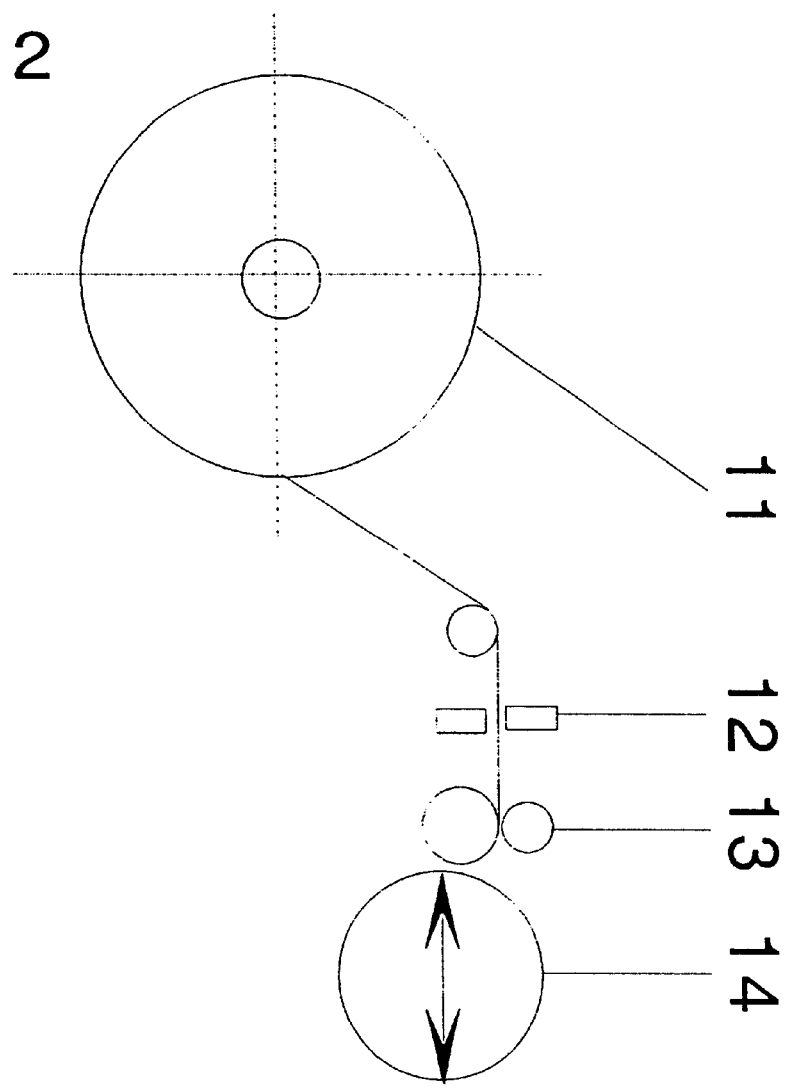
FIG. 2 diagrammatically illustrates a second part of the same plant.
Figure 2:
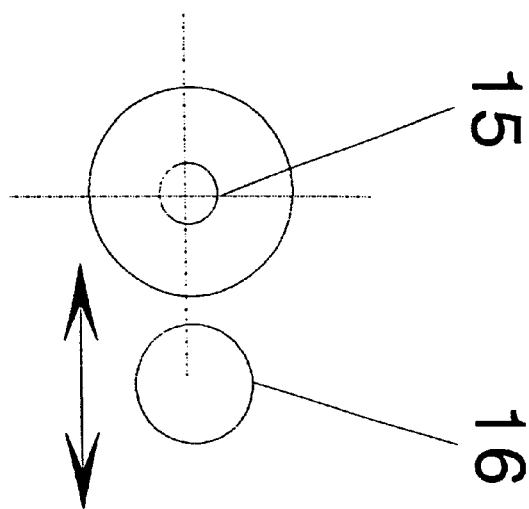

Reference is now made to FIG. 2, showing the downstream or second section of the production line, in which the bobbin 11 is in fact shown as being included also in this part of the line. For the remainder of the manufacturing process, the mat is unwound from the bobbin 11.

In this example, a tube 14 is formed by contact with heating cylinders 13. The internal diameter of the tube 14 is defined by means of a variable diameter mandrel 15 comprising a set of rings, while the external diameter of the tube 14 is defined by means of a feed regulator 12, which controls the rate at which the band is drawn off the bobbin 11. The tube 14 is cut into a plurality of annular rings by means of slitters 16. The mean width of these annular rings is 15 mm.

Each of these annular rings is then placed in a mold, not shown, which has, depending on the particular apparatus with which the friction material produced by this process is to be equipped, a base which is flat and which may or may not be grooved. The material is cured in the mold by heating at 150–200° C. under a pressure that varies between 20 and 300 bars, after which the mold is opened and the annular ring of friction material thus formed is cooled. The cold ring is then deburred by grinding.

The annular ring is then supercured in a tunnel, not shown, in a heating cycle in which it is heated at different rising temperatures. The supercured ring is then subjected to operations of sizing to the correct thickness, piercing, and flattening. The residues from these operations of sizing, piercing and flattening are recovered so that they can be subsequently reused.

Three sets, each of two clutch friction discs, made in accordance with the above method from the compositions in examples A, B and C quoted earlier herein have undergone endurance tests under the conditions described below.

Two discs of one set, corresponding to a single embodiment of the invention, are placed in a testing machine of the type defined by the standard ECF07005. The test includes four series of cycles, in which each cycle consists of braking to a stop an inertia mass which has previously been brought to a speed of rotation of 3000 revolutions per minute.

The first series consists of 500 cycles with an inertia of 43 kilojoules. The second series consists of 1000 cycles with an inertia of 43 kilojoules. The third series consists of 1000 cycles with an inertia of 62 kilojoules, while the fourth series consists of 500 cycles with an inertia of 81 kilojoules.

The mean dynamic coefficient of friction of each of the three test samples obtained in the endurance tests described above is given in the following table.

| Mean coefficient of friction | Example A | Example B | Example C |
| --- | --- | --- | --- |
| First series | 0.35 | 0.40 | 0.35 |
| Second series | 0.41 | 0.46 | 0.35 |
| Third series | 0.36 | 0.47 | 0.36 |
| Fourth series | 0.35 | 0.47 | 0.33 |
| Total wear (two faces) | 0.40 mm | 0.45 mm | 0.50 mm |

It is found that the friction coefficient of the friction material displays a remarkable degree of stability. In addition, it is found that only a very small amount of wear takes place in the material.

What is claimed is:

1. A friction material for a dry friction device manufactured without the use of an organic solvent, the material comprising a mat of fibers impregnated with a thermosetting resin, the fibers having a mean length of 4 cm to 12 cm said mat further including dust, wherein said mat is without an organic solvent.

2. The material according to claim 1, wherein said fibers are of at least one substance selected from the group consisting of fibers of cotton, viscose, linen, polyacrylonitrile, preoxidized polyacrylonitrile, para-aramide, meta-aramide, mineral fibers, rock wool, ceramic.

3. The material according to claim 2, wherein the mat further includes, incorporated in the mat, glass in at least one form selected from the group consisting of continuous filament, roving, textured fiber, bulked fiber.

4. The material according to claim 3, wherein said glass fibers have diameters in the range between 6 and 21 micrometers.

5. The material according to claim 4, wherein said glass fibers are fibers treated beforehand by at least one process selected from adhesion, impregnation with phenolic resin, impregnation with rubber.

6. The material according to claim 1, wherein the mat further includes particulate fillers incorporated into the mat.

7. The material according to claim 6, wherein said particulate fillers comprise, at least partly, substances selected from the group consisting of copper, rock wool, powdered nitryl rubber, carbon black, hexamethylene tetramine, gilsonite, litharge, melamine resin, phenolic resin, sulphur, cardolite, zirconium silicate, iron sulphide, alumina, latex, used clutch friction liners reduced to powder, friction line,r rectification dust, zinc oxide.

8. A rotatable clutch friction disc for dry friction operation, having at least one friction liner according to claim 1.

9. A friction material for a dry friction device manufactured without the use of an organic solvent, the material consisting essentially of a mat of fibers impregnated with a thermosetting resin, the fibers having a mean length of 4 cm to 12 cm, and wherein said mat is without an organic solvent.

10. A friction material for a dry friction device manufactured without the use of an organic solvent, the material comprising a mat of fibers impregnated with a thermosetting resin, the fibers having a mean length of 4 cm to 12 cm and the mat without an organic solvent.

11. A friction material for a dry friction device manufactured without the use of an organic solvent, the material comprising a mat of fibers impregnated with a thermosetting resin, the fibers having a mean length of 4 cm to 12 cm and said mat further including dust obtained from the rectification of friction liners, wherein said mat is without an organic solvent.

12. A friction material for a dry friction device manufactured without the use of an organic solvent, the material comprising a mat of fibers impregnated with a thermosetting resin, the fibers having a mean length of 4 cm to 12 cm and said mat further including powder and dust, wherein said mat is without an organic solvent.

13. A friction material for a dry friction device manufactured without the use of an organic solvent, the material comprising a mat of fibers manufactured using a carding process and impregnated with a thermosetting resin, the fibers having a mean length of 4 cm to 12 cm wherein said mat is without an organic solvent.

* * * * *